United States Patent
Verthein et al.

(10) Patent No.: US 6,487,196 B1
(45) Date of Patent: Nov. 26, 2002

(54) SYSTEM AND METHOD FOR SIMULATING TELEPHONE USE IN A NETWORK TELEPHONE SYSTEM

(75) Inventors: William Verthein, Roselle, IL (US); Stanley T. Naudus, Springfield, VA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/093,838

(22) Filed: May 29, 1998

(51) Int. Cl.[7] .............................................. H04M 1/253
(52) U.S. Cl. ................................... 370/352; 379/93.09
(58) Field of Search ................................. 370/352, 353, 370/354, 355, 356, 401; 379/207.02, 207.04, 207.05, 207.06, 207.07, 207.08, 207.09, 900, 93.01, 93.08, 93.09

(56) References Cited

U.S. PATENT DOCUMENTS

| | | | |
|---|---|---|---|
| 4,387,424 A | | 6/1983 | Frediani et al. |
| 4,471,427 A | | 9/1984 | Harris |
| 4,590,551 A | | 5/1986 | Mathews |
| 4,825,354 A | | 4/1989 | Agrawal et al. |
| 5,142,623 A | | 8/1992 | Staab et al. |
| 5,218,680 A | | 6/1993 | Farrell et al. |
| 5,291,479 A | | 3/1994 | Vaziri et al. |
| 5,295,133 A | | 3/1994 | Jurkevich |
| 5,410,754 A | | 4/1995 | Klotzbach et al. |
| 5,412,660 A | | 5/1995 | Chen et al. |
| 5,517,556 A | | 5/1996 | Pounds et al. |
| 5,528,595 A | | 6/1996 | Walsh et al. |
| 5,577,105 A | | 11/1996 | Baum et al. |
| 6,069,890 A | * | 3/2000 | White et al. ................. 370/352 |
| 6,067,350 A | * | 5/2000 | Gordon ....................... 370/252 |
| 6,122,255 A | * | 9/2000 | Bartholomew et al. ..... 370/352 |
| 6,175,563 B1 | * | 1/2001 | Miloshavsky ............... 370/252 |
| 6,201,804 B1 | * | 3/2001 | Kininis ........................ 370/352 |
| 6,243,373 B1 | * | 6/2001 | Turock ........................ 370/352 |
| 6,243,376 B1 | * | 6/2001 | Ng et al. ..................... 370/352 |
| 6,292,478 B1 | * | 9/2001 | Farris ......................... 370/352 |
| 6,304,567 B1 | * | 10/2001 | Rosenberg .................. 370/356 |

OTHER PUBLICATIONS

"RTP: A Transport Protocol for Real–Time Applications" H. Schulzrinne et al., Lawrence Berkeley National Laboratory, Jan., 1996.

(List continued on next page.)

Primary Examiner—Ricky Ngo
(74) Attorney, Agent, or Firm—McDonnell Boehnen Hulbert & Berghoff

(57) ABSTRACT

A system and method in a network-based telephone system for simulating a typical plain old telephone system (POTS) connection by generating sounds in response to conditions in the telephone connection that simulate POTS sounds that occur during the typical POTS connection. Telephones in a network-based telephone system are connected to a wide-area network (WAN) such as the Internet via an Internet telephony gateway. A calling telephone connects to the local exchange carrier to permit a user to connect to a calling Internet telephony gateway by dialing an access telephone number. The calling Internet telephony gateway receives access information and the destination telephone number and uses the destination telephone number to determine the Internet telephony gateway that is closest to the called telephone with the destination telephone number. The calling Internet telephony gateway connects to the called Internet telephony gateway which connects to the called telephone number. During the setup of the connection, the calling Internet telephony gateway generates dialing sounds to the calling telephone. The Internet telephony gateway may also generate busy signals, fast busy signals, click sounds and comfort noise sounds to provide the caller with a POTS feel.

29 Claims, 6 Drawing Sheets

OTHER PUBLICATIONS

"ITU–T Draft Recommendation H.223/Annex A" Peter Vogel, International Telecommunication Union, Jul., 1996.

"Pulse Code Modulation (PCM) of Voice Frequencies" International Telecommunication Union, 1993.

"Video Coding for Low Bit Rate Communication" International Telecommunication Union, 1996.

"Video Codec for Audiovisual Services at p×64 kbits" International Telecommunication Union, 1994.

"Draft H.225.0, Version 2" International Telecommunication Union, Jun. 11, 1997.

"Dual Rate Speech Coder for Multimedia Communications Transmitting at 5.3 and 6.3 kbit/s" International Telecommunication Union, 1996.

"RTP Profile for Audio and Video Conferences with Minimal Control" H. Schulzrinne, GMD Fokus, Jan., 1996.

"Recommendation H.234—Version 2" International Telecommunication Union, Mar. 24, 1997.

* cited by examiner

SYSTEM AND METHOD FOR SIMULATING TELEPHONE USE IN A NETWORK TELEPHONE SYSTEM

A. FIELD OF THE INVENTION

The present invention relates to telephony services using a wide-area network (WAN) as a transport medium, and more particularly to the simulation of telephone use in an Internet-based telephone system.

B. BACKGROUND OF THE INVENTION

The growth of the Internet has made it possible for users to obtain information from sources located virtually anywhere in the world. Users communicate over the Internet by connecting computers and computer networks to the Internet's data transport facilities.

In order to facilitate such communication, industry and international standards bodies have established sets of functional requirements, conventions or rules that govern the transmission of data over both telephone and packet switched computer networks. These functional requirements or rules are known in the art as "protocols." The implementation of protocols is necessary in order to bring order, and standardization, to the communications field and allow equipment of diverse manufacturers to be interoperable.

Some protocols are considered low level transmission media related modulation protocols, such as modulation schemes implemented in a modem, for example V.34, V.22 bis, etc. Other protocols are considered higher level, and relate to such features as error control, transmission control protocols and network level routing and encapsulation of data. Examples of such protocols are the Point-to-Point Protocol (PPP), the Serial Line Interface Protocol (SLIP), and the Real-time Transport Protocol (RTP). The requirements of these latter protocols are typically prepared as a "Request For Comment" document, circulated among the industry, and eventually adopted by developers.

Developers have applied the various functions defined in protocols to develop devices and systems that improve the performance and capabilities of the Internet. One such device is a "network access server". The network access server is a device that is capable of receiving a plurality of simultaneous incoming calls from the Public Switched Telephone Network (PSTN) and routing them to a packet switched computer network for transmission to a host computer system, or telephone or other device connected to the computer network. The network access server is also capable of handling multiple simultaneous calls from the computer network and directing them onto a communications link in the PSTN for transmission to the remote user.

The patent to Dale M. Walsh et al., U.S. Pat. No. 5,525,595, which is fully incorporated by reference herein, describes an integrated network access server suitable for use in the present invention. Such a device has been commercialized widely by 3Com Corporation (previously U.S. Robotics Corp.) under the trade designation Total Control™ Enterprise Network Hub. Network access servers similar in functionality, architecture and design are available from other companies, including Ascend Communications, Livingston Enterprises, Multitech, and others. The invention is suitable for implementation in network access servers from the above companies, and other similar devices.

Improvements in network access servers and in the development of protocols for a variety of functions have resulted in the development of other applications for the Internet. For example, Internet Telephony would use the Internet to connect two or more plain old telephones (POTS). Internet telephony would make long distance calls substantially less costly. Internet telephony would potentially add functions to phone service that may currently not be easy to provide. For example, impromptu conferences (like CHAT ROOMS), anonymous meeting services, etc. may be needed.

Examples of Internet telephony systems are disclosed in U.S. patent application Ser. No. 08/970,834, "DISTRIBUTED PROCESSING OF HIGH LEVEL PROTOCOLS, SUCH AS REAL TIME TRANSPORT PROTOCOLS, IN A NETWORK ACCESS SERVER" to Daniel Schoo et al., which is hereby incorporated by reference. Schoo et al. discloses a network access server that uses the Real-time Transport Protocol (RTP) to connect a H.323 client PC to a telephone. In the system in Schoo et al., telecommunications devices may connect via the PSTN to a network access server. The network access server converts audio and video signals to separate audio and video streams in H.323 format. The streams are transported over the Internet to H.323 computers connected to the Internet.

The systems disclosed in Schoo et al. are particularly suited for use in real-time video conferencing. It would be desirable to have an Internet telephony system that would provide the functions and services of a plain-old telephone service. One way to connect two telephones over a wide-area network (WAN), such as the Internet, is to connect them to separate, called and calling, network access servers by using methods and systems disclosed in Schoo et al. The first telephone would communicate with the second telephone by starting Internet sessions to carry audio signals from the called network access server to the calling network access server closest to the second telephone. The calling network access server may dial a call to the second telephone according to call-setup instructions from the called network access server. The advantage of using the Internet for telephone service is that long distance calls may be made for the cost of local calls and new features may be added to phone service. When the first telephone initiates the connection by connecting to the first network access server, it makes a local call.

In order to communicate audio signals in an Internet-based telephone system, the network access server uses the audio signals received from the first telephone over the PSTN. These audio signals are typically pulse code modulated (PCM) signals according to the international G.711 standard. As described in Schoo et al., G.711 audio signals may need to be transcoded to G.723 or G.729 compressed audio signals to conserve bandwidth. The compressed audio signals are packetized and communicated in streams of packets over the Internet as discussed in Schoo et al.

The sound made on a telephone in an Internet-based telephone system is transported to the destination telephone number in a digitized form. Consequently, many of the sounds associated with plain old telephone service (POTS) over analog lines are not transported. For example, periods of silence in a POTS telephone create a sound while the telephone connection is available. The sound may be a soft noise, however, it is perceptible and different from the complete silence that a user would hear when the connection is no longer available. Many of the sounds in a POTS telephone may arise from limitations of the telephone system, however, the sounds provide feedback to the user that informs the user as to the status of the connection. Many of these sounds are so familiar that they are capable of communicating the status of a call more efficiently than a voice message.

The digitized form in which sound is transported in an Internet-based telephone system may not allow a user to determine the status of a call. The digitized form may sound completely silent during periods of silence. The sound heard by the user is different from the sound heard on a POTS telephone. In an Internet-based telephone system, a user picks up a telephone and hears complete silence before beginning to dial. There would be no indication that the telephone system is even working. Tones may be generated during dialing. However, until voices are generated at the telephone, the user hears nothing. If the other party in the telephone call hangs up first, only silence is heard. The user may let several seconds elapse before wondering if perhaps the other party hung up. Users may find it difficult to accept such differences in Internet-telephone service.

It would be desirable for the network-based telephone system to sound more like a plain old telephone to provide a user of the network-based telephone the "feel" of plain old analog telephone service.

SUMMARY OF THE INVENTION

In view of the above, a network-based telephone system provides telephone connections in a network-based telephone system with the feel of a typical POTS telephone connection. A telephone connection in the network-based telephone system permits a calling telecommunications device and a called telecommunications device to communicate over a wide-area network (WAN). The system comprises a calling network access server connected to the calling telecommunications device and a called network access server connected to the called telecommunications device.

The calling network access server comprises a call process driver for connecting to the called network access server to initiate a telephone connection when a user actuates the calling telecommunications device. The call process driver also monitors and detects conditions in the telephone connection. The calling network access server also includes a POTS-sound generator for generating POTS-sounds similar to sounds made in the typical POTS telephone connection when the call process driver detects a corresponding condition in the telephone connection. The POTS-sounds may be generated using WAV files or by inputting strings of sound data in the telephone connection. The sounds are communicated to the calling telecommunications device, the called telecommunications device or both. The called network access server completes the telephone connection by connecting to the called telecommunications device when the call process driver connects to the called network access server.

The telephone connection provides the user with a POTS-like "feel" because the user hears sounds that are familiar and for which the causes are well known. For example, a user on a telephone in a POTS service knows that a "click" sound from the other party is an indication that the other party is no longer connected. The POTS-sound generator makes it possible to give the user a similar type of feedback over an Internet-telephone connection.

In another aspect of the invention, a method provides a network-based telephone connection with a POTS-like feel. The network-based telephone system comprises a calling telecommunications device communicably connected to a wide area network (WAN) to communicate with a called telecommunications device. The method provides a POTS-like feel by simulating a typical plain old telephone system (POTS) connection for a user of the telecommunications device. According to the method, a condition is detected in a telephone connection between the calling telecommunications device and the at least one called telecommunications devices. A sound is generated in response to the condition. The sound is similar to a corresponding POTS sound when a POTS condition corresponding to the condition exists in the typical POTS telephone connection.

In another aspect of the present invention, the method further includes steps for establishing the telephone connection when the user actuates the telecommunications device to connect to the WAN. A destination telephone number is dialed to the called telecommunications device. A dialing sound similar to a corresponding dialing sound in the typical POTS connection is generated while the telephone connection is being established. The calling telecommunications device is connected to the called telecommunications device using the destination telephone number. The telephone connection is completed by actuating the called telecommunications device.

These and many other advantages and features of the invention will become more apparent from the following detailed description of presently preferred embodiments of the invention.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

A. Internet Telephony System

Figure 1:
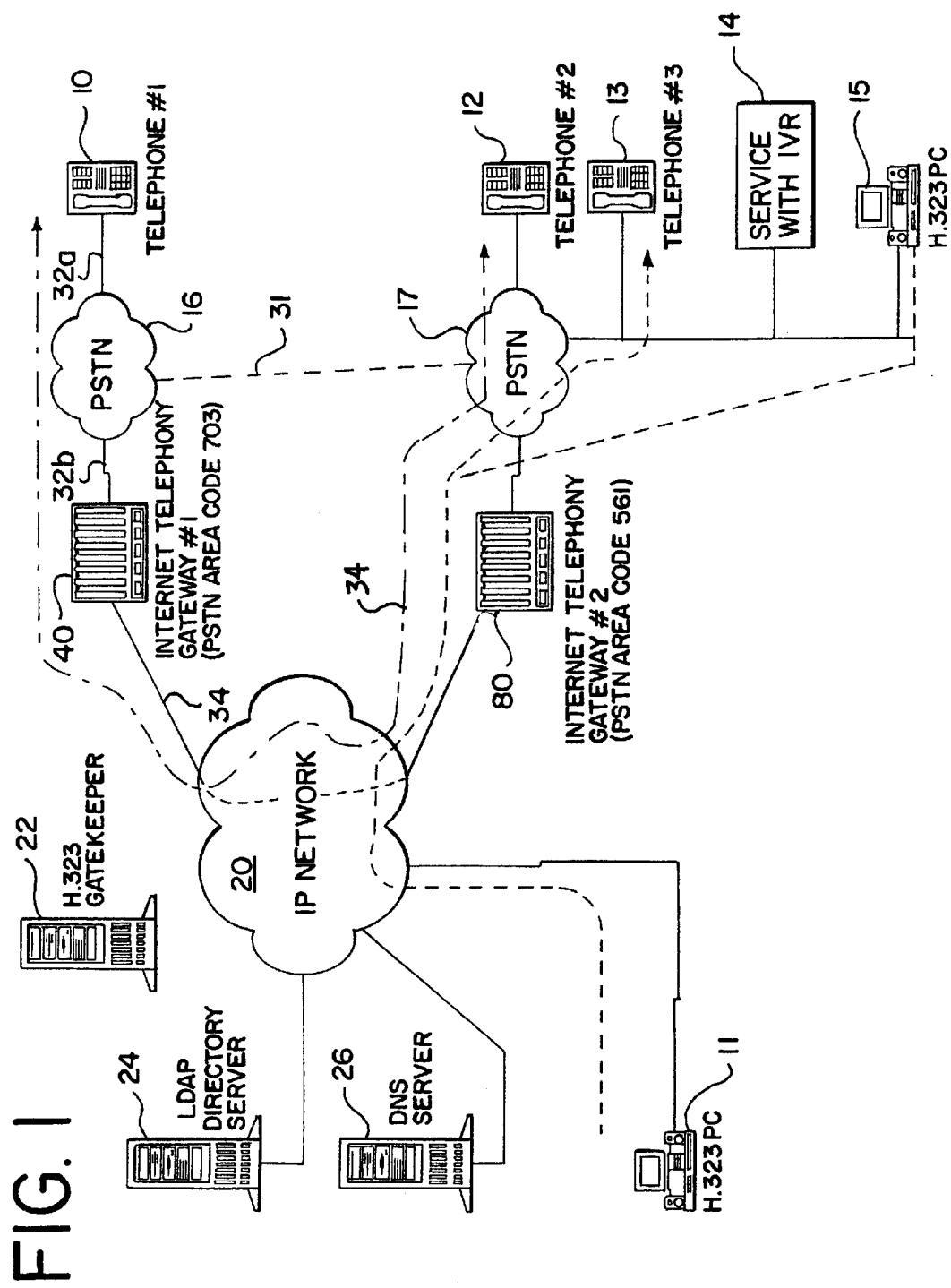
FIG. 1 is a high level diagram of a network-based telephony system in which the present invention finds particular use.

FIG. 1 is a block diagram of a network-based telephony system of a type in which the present invention finds particular use. It is to be understood by one of ordinary skill in the art that, although the description below is directed at using the Internet as a WAN in preferred embodiments, any wide area network capable of transporting data representing real-time audio signals may be used as well. One of ordinary skill in the art would know how to make the appropriate modifications to the example embodiments described below.

One category of modifications that may be addressed by one of ordinary skill in the art involves the protocols selected for processing the data and signals communicated. Preferred embodiments make use of the following protocols and standards as discussed in the description that follows:

ITU-T Recommendation G.711 (1988) "Pulse Code Modulation (PCM) of Voice Frequencies."

ITU-T Recommendation G.723 "Dual Rate Speech Coder for Multimedia Communications Transmitting at 5.3 and 6.3 Kbit/s"

ITU-T Recommendation H.323 "Visual Telephone Systems and Equipment for Local Area Networks Which Provide a Non-Guaranteed Quality of Service"

ITU-T Recommendation H.225 (1996), "*Media Stream Packetization and Synchronization on Non-Guaranteed Quality of Service LANs.*"

RFC 1889: RTP: A Transport Protocol for Real-Time Applications, Jan. 25, 1996

RFC 1890: RTP Profile for Audio and Video Conferences with Minimal Control, Jan. 25, 1996

ITU-T Recommendation Q.931 Digital Subscriber Signaling System No. 1 (DSS 1)—ISDN User-Network Interface Layer 3 Specification for Basic Call Control ITU-T Recommendation H.245 Control Protocol for Multimedia Communication The documents listed above are incorporated by reference.

It is to be understood by one of ordinary skill in the art that any reference to the protocols listed above are made in the description below purely by way of example. Preferred embodiments may use these protocols to take advantage of the wide acceptance of the protocols in the industry. One of ordinary skill in the art will understand that alternatives not listed above may also be used when appropriate.

Referring to FIG. 1, a network-based telephony system may include a first telecommunications device 10 connected, via a first local exchange (LEX) 16 of the public switched telephone network (PSTN) to a first Internet telephony gateway 40. An example of a product suitable for use as Internet telephony gateway 40 is the Total Control™ Enterprise Network Hub, available from 3Com Corp., the assignee of the present invention. The Internet telephony gateway 40 is connected to a wide-area network (WAN) 20 which communicates to other users of the network via network access servers such as a second Internet telephony gateway 80. The second Internet telephony gateway 80 communicates via a second LEX 17 to the PSTN with second telecommunications devices 12, 13, 14, 15. The network-based telephone system provides a telephone connection 30a over the WAN that is an alternative to the typical POTS telephone connection 31.

Alternative network based telephone connections are illustrated in FIG. 1 at a PC to phone connection 30b and a PC-to-PC connection 30c. The PC to phone connection 30b provides a network-based telephone connection between a PC 11 and the telecommunications device 10. The PC-to-PC connection 30c provides a network-based telephone connection between a PC 11 and a PC 15. The PC to phone connection 30b and the PC to PC connection 30c includes the PC 11 which, preferably, is an H.323 PC client that interacts with the telephony gateway 40, 80 through H.323.

The telecommunications devices 10, 12, 13, 14 may include any device capable of communicating audio signals over the PSTN. For example, the second telecommunications devices may include telephones 12, 13 and a service with integrated voice response (IVR) 14. Examples of services with IVR 14 include voice mail or other message maintenance services, banking services performed by telephone, order processing services that permit purchasing merchandise by telephone, and any other service offered by an enterprise that may use DTMF signals as user input in response to voice prompts. Any of the telecommunications devices 10, 12, 13, 14 may also include PBXs, computers and other equipment with a PSTN interface.

The WAN 20 in a preferred embodiment of the present invention is the Internet, one of the most commonly used WAN's in the world. Alternatively, a private IP network in a WAN or a LAN (local area network) configuration may be used.

Internet resources such as an LDAP Directory Server 24 and a Domain Name Server 26 may be used to obtain IP addresses for destination Internet telephony gateway's. A gatekeeper 22 is used as a central database of subscribers to a network-based telephony service to provide authentication of the right to access the network resources.

The first and second LEX's 16, 17 are preferably the local exchanges of the first telecommunications device 10 and the second telecommunications devices 12, 13, 14, respectively. The first and second telecommunications devices 10, 12, 13, 14 connect to the LEX's 16, 17 at connections 32a, 36a in conventional ways. For example, connections 32a and 32b to the first Internet telephony gateway 40 and connections 36a and 36b to the second Internet telephony gateway 80 may include an Integrated Services Digital Network (ISDN) connection. Alternatively, connection 32a may include typical connections to a central office (not shown) in the LEX 16 and connection 32b may include a T1 (or DSO) line. In a preferred embodiment, internet telephony gateway's 40, 80 include an interface that is capable of connecting by either a T1 or an ISDN connection.

The Internet telephony gateway's 40, 80 are connected to the well-developed Internet infrastructure by a network connection 34 capable of supporting the TCP/IP and UDP/IP protocols.

Referring to FIG. 1, the telephone connection 30 may be made and used for communication between the first telephone 10, the second or third telephones 12, or the service having IVR 14. Although the telephone connection 30 may be made using a variety of different schemes, it would be desirable to simulate the way in which a user makes telephone calls over traditional service carriers, such as by POTS telephone connection 31. Because the telephone connection 30 over the WAN involves the transport of data representing the audio, the connection 30 does not have many of the sounds that exist in the primarily acoustic POTS connection 31. However, the sounds in the POTS connection 31 are familiar to users who have come to depend on certain sounds to indicate certain conditions in the POTS connection 31.

In the discussion that follows, the device described above as the first telecommunications device 10 is referred to as the calling telecommunications device 10; the first Internet telephony gateway 40 is referred to as the calling Internet telephony gateway 40; the second Internet telephony gateway is referred to as the called Internet telephony gateway 80; and the second telecommunications device 12 is referred to as the called telecommunications device 12.

1. Switch Dependent Internet Telephony Gateway

The first procedure is dependent on the central office of the LEX's 16, 17 to provide caller authentication, caller authorization, billing and interactive voice prompts. In addition, switches that support provisioning modes that enable a telephone user to signal the switch to use an Internet telephony gateway for telephone service rather than the traditional PSTN are widely available in central offices.

To place a call using the first scheme, a caller dials to the central office (CO) switch of the first LEX 16. Dialing may involve the use of A&B robbed bits to supply dial pulses by alternating the signaling bits between 0 and 1 to mimic rotary dial pulses (plus supervisory states including on-hook, off-hook, disconnect, and busy). In a preferred embodiment, dialing is accomplished by either using DTMF tones that are multiplexed with the actual voice traffic on connection 32a, or by using ISDN PRI signaling.

The connection to the Internet telephony gateway 40 may be established in a couple of ways. The caller may dial directly to a hunt group associated with the CO switch and get prompted via a pre-recorded announcement to provide the destination telephone number, user identification and Personal Identification Number (PIN). Alternatively, the CO switch may be provisioned to accept the destination telephone number upon receiving an access code from the caller. This access code allows the call to be forwarded along the outgoing trunk-line (at connection 32b) to the Internet telephony gateway 40.

Afterwards, the CO switch forwards the call (with the destination telephone number) to the Internet telephony gateway using either (1) ISDN PRI signaling with the destination (E.164) telephone number contained within a Q.931 Setup message (see description below); and (2) Channelized T1 signaling with the destination telephone number supplied to the Internet telephony gateway using DTMF.

The CO switch at the first LEX 16 supplies the destination telephone number to the calling Internet telephony gateway 40 using either ISDN PRI or channelized T1 signaling at connection 32b. The calling Internet telephony gateway 40 queries an address database to obtain a transport address of the called Internet telephony gateway 80, which is the Internet telephony gateway nearest to the destination telephone number. The Internet telephony gateway 40 establishes an H.323 compliant connection 34 with the called Internet telephony gateway 80 nearest to the called LEX 17. The H.323 compliant connection 34 is a channel of data defined by the H.323 ITU-T Recommendation for visual telephone systems and equipment. The H.323 channel is carried over an Internet data connection. The connection 34 includes streams of data representing the audio signals according to the H.225 protocol for defining media stream packets. The connection 34 may be controlled by an interchange of control messages between the Internet telephony gateway's 40, 80. The control messages are preferably communicating in their own channel according to the H.245 control protocol for multimedia communication.

The connection 34 is created using the Q.931 protocol for setting up calls between the calling Internet telephony gateway and the called Internet telephony gateway 40, 80. For example, the calling Internet telephony gateway 40 sends a Q.931 Setup message to the called Internet telephony gateway 80. The calling Internet telephony gateway 40 receives a Connect message from the called Internet telephony gateway 80 to indicate acceptance of the call. The calling Internet telephony gateway 40 may receive a Release Complete message to indicate refusal of the call.

During the creation of the connection 34, an H.245 TCP control channel is created for session control and capability exchange. The capability exchange may include terminal capabilities indication, master/slave determination and opening of the logical channels for audio in each direction.

The called Internet telephony gateway 80 uses the destination telephone number received from the calling Internet telephony gateway 40 to place a call to the destination telephone user through the central office of the second LEX 17.

2. Switch Independent Internet Telephony Gateway

A second scheme for placing a network-based telephone call involves the use of a switch independent Internet telephony gateway. The calling Internet telephony gateway 40 in this scheme includes a call process driver (described below with reference to FIG. 3) to perform call authentication, call authorization, billing, interactive voice prompts and other call processing functions that a switch might normally perform. The call process driver communicates with a gatekeeper 22 for call setup information such as the Internet transport address for the called Internet telephony gateway 80 and for H.225 registration, admission and status information. The call process driver also includes an interactive voice response driver and a voice prompt driver to perform the call setup as described below.

The call setup process in the second scheme is started when the first telecommunications device 10 signals the first LEX 16 to initiate a phone call. The caller dials the hunt group of the calling Internet telephony gateway 40 using either channelized T1 via DTMF or ISDN PRI signaling. The calling Internet telephony gateway 40 determines a telephone connection is being attempted and plays out a recorded "Welcome" IVR message followed by the "Billing" IVR message request for the User/Payment Information. The calling phone user enters User/PIN/Payment Information using DTMF (e.g., using a touch-tone key-pad). The calling Internet telephony gateway 40 forwards the User/PIN/Payment Information to a process for Billing, Authorization, and Authentication Services for approval.

When the calling Internet telephony gateway 40 receives approval, it plays out a recorded "Destination Phone Number" IVR requesting for the destination phone number. The calling Phone User enters the destination phone number DTMF. The calling Internet telephony gateway 40 may provide feedback of the status of the call to the calling user by playing a "Call is Being Setup" IVR message. The calling Internet telephony gateway 40 sends a registration, admission and status address request message to the gatekeeper 22 requesting the transport address of the called Internet telephony gateway 80 that is connected to the destination PSTN party. The gatekeeper 22 responds with an admission confirmation message specifying the called Internet telephony gateway 80 to use. The Internet telephony gateway's 40, 80 should discover the Gatekeeper 22 during an initialization phase of the Internet telephony gateway 40, 80. If the Internet telephony gateway 40, 80 does not know the gatekeeper's IP Address, then it should use the domain name server 26 to locate it.

The calling Internet telephony gateway 40 establishes an H.225:Q.931 TCP channel between the calling and calling Internet telephony gateway 40, 80 to carry the call setup messages. The calling Internet telephony gateway 40 sends a Setup message to the called Internet telephony gateway 80. The calling Internet telephony gateway receives a Connect message (or Release Complete indicating refusal of the call) from the called internet telephony gateway 80 indicating acceptance of the call. The calling Internet telephony gateway 80 also establishes an H.245 TCP Control Channel between the calling and called Internet telephony gateway's 40, 80 for call control and capability exchange. The capability exchange may include indicating terminal capabilities, master/slave determination, and signal opening logical channels for audio in each direction. The called Internet telephony gateway 80 uses the destination E.164 address in the Setup message to place the outbound call. Once the destination PSTN connection 36a, 36b is made, the called Internet telephony gateway 80 sends a connect message informing the calling Internet telephony gateway 40 that a connection to the destination PSTN phone has been successfully made.

B. Network Access Server

The Internet telephony gateways 40, 80 in FIG. 1 which is a network access server, or network access server with an application for internet telephony. Examples of network access servers are described in Schoo et al. and in Walsh et al.

Figure 2:
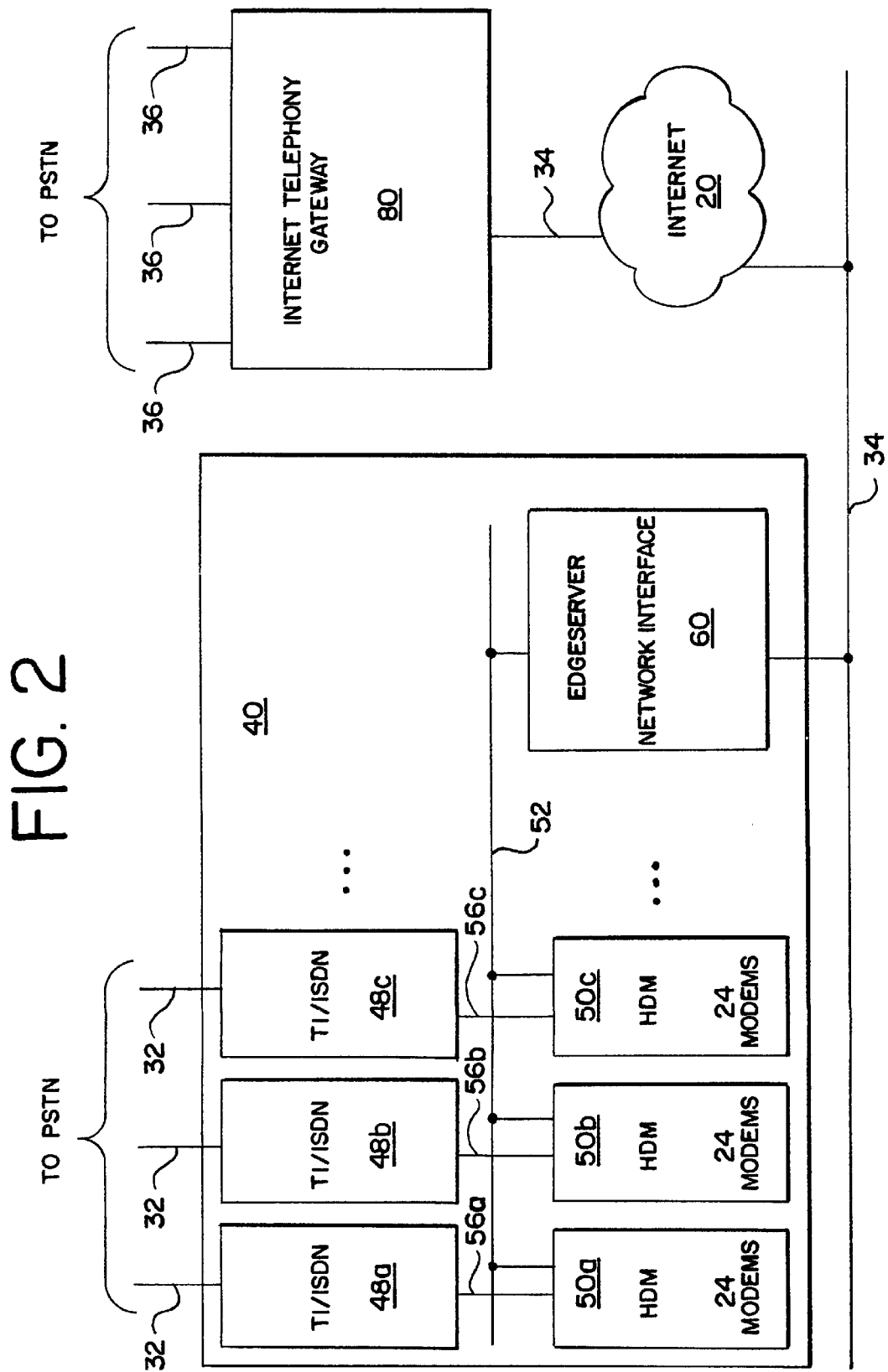
FIG. 2 is a schematic diagram of the Internet telephony gateway used in the network-based telephone system in FIG. 1.

The architecture of a network access server configured as the Internet telephony gateway 40 in a preferred embodiment is shown in FIG. 2. The Internet telephony gateway 40 in FIG. 2 includes a plurality of high-density modems (HDM) 50a–c each having at least T1/ISDN or E1 telephone line interface 48a–c. The term "HDM" for the modem cards 50a–c in FIG. 2 is an acronym for "high density modem," indicating that each card performs modem functions for a large number of channels on the telephone line. For example, each HDM 50 may perform modem functions for 23 B channels plus 1 D channel for an ISDN Primary Rate Interface, 24 DSO channels for a T1 line and 30 channels for an E1 line.

The HDMs 50 communicate with a network interface 60 over a bus 52. The HDMs 50a–c, the T1/ISDN telephone line interfaces 48a–c and the network interface 60 are preferably on individual printed circuit boards or cards arranged in a chassis. The HDMs 50 are "high density" in that each HDM 50 contains a high-density digital signal processing (DSP) configuration capable of handling 23, 24 or 30 DSO channels.

By providing a set of high density modem cards 48 and a robust computing platform in the network interface 60, a single chassis can process many hundreds of calls through the device simultaneously In the embodiment of FIG. 2, each HDM card 50a–c has its own T1/ISDN telephone line interface 48a–c connected to an ISDN PRI or T1 line at connection 32. The T1/ISDN telephone line interface 48 is connected to the high-density modem cards by a TDM bus 56a–c, as described in detail in the Walsh et al. '595 patent. The T1/ISDN telephone line interface 48 of FIG. 2 is described in detail in the Walsh et al. '595 patent, therefore the reader is directed to that patent for a detailed discussion of its construction and functionality. The T1/ISDN telephone line interface 48 card is composed of two separate modules (not shown), an incoming call interface module and an incoming call application module. The interface module physically receives the incoming T1 span lines at connection 32, converts the signal in a digital TTL format, and delivers the signal to the incoming call application module. The interface module provides a channel switching unit (CSU) interface which recovers clock signals and data from the incoming T1 signals, and also provides the transmission of outgoing digital telephone signals representing digital data to the T1 line at connection 32. The application module provides framing of recovered T1 data to extract the T1 DSO channel data and then switches the channel data twenty four time slots on a TDM bus 56 to the corresponding HDM 50.

An alternative for connecting the T1/ISDN telephone line interface cards 48a–c to the HDMs 50a–c would be to provide a plurality of T1/ISDN telephone line interface cards 48 and distribute channel data to the modems via a TDM bus with extra highway lines, as described in Schoo et al.

The HDM cards 50 are connected to the network interface card 60 via the high speed parallel packet bus 52, similar to that described in the Walsh et al. patent. The number of HDM cards 50 and associated telephone line interface cards 48 is essentially arbitrary, but 10 to 24 such cards are typical in a high density network access server application today, providing modem functionality for between 240 and 576 T1 DSO channels. In a preferred embodiment, the bus 52 is an S-Bus packed system bus. Any other suitable bus, or communications connection, may also be used. For example, alternatives include a Cell Bus (e.g., a Hsynchronous Transfer Mode Bus) and an Industry Standard Architecture Bus.

The network interface or EdgeServer™ card 60 consists of a general purpose computing platform (such as an IBM PC) running a stand alone or shareware network operating system such as Windows NT™ from Microsoft Corporation or UNIX. The network interface card 60 contains software and hardware modules to perform call routing, modem configuration and other features as set forth and described for the gateway modules in the Walsh et al. '595 patent and the Baum et al. patent, U.S. Pat. No. 5,577,105, also incorporated by reference herein. Further details on the design and features of the EdgeServer™ card 382 are set forth in the U.S. patent application of William Verthein et al. Ser. No. 08/813,173, the contents of which are incorporated by reference herein.

The network access server (or Internet telephony gateway 40) shown in FIG. 2 is useful for a number of different types of applications, such as Internet access, remote access to corporate backbone networks, video and audio conferencing, Internet telephony, digital wireless Internet and corporate network access, to name a few. In an Internet telephony embodiment, the product provides a facility for users to engage in long distance telephone, audio/visual and/or data sessions using the Internet as the transport medium rather than the long distance public switched telephone network of the inter exchange carriers. Users realize substantial savings in transmission charges as compared to phone charges.

C. Audio and DTMF Signals in a Telephone Connection

1. Audio and DTMF Streams

Once the telephone connection 30 is made, an audio signal carrying the user's voice is communicated in full duplex between the two telecommunications devices 10, 12. The audio signal may include DTMF signals if either the called or the calling telecommunications device 10, 12, 14 include applications that require signaling. DTMF signals are available on all telephones or are easily generated by other devices, and are, therefore, convenient providers of such signaling. Applications that may use such signaling include banking by phone, voicemail, PBX systems, message machines with DTMF control, appliances with a telephone interface for control by DTMF signals, keyed telephone systems and phone ordering systems. When a user calls to telecommunications devices using such applications, the telephone connection 30 should carry DTMF signaling.

Figure 3:
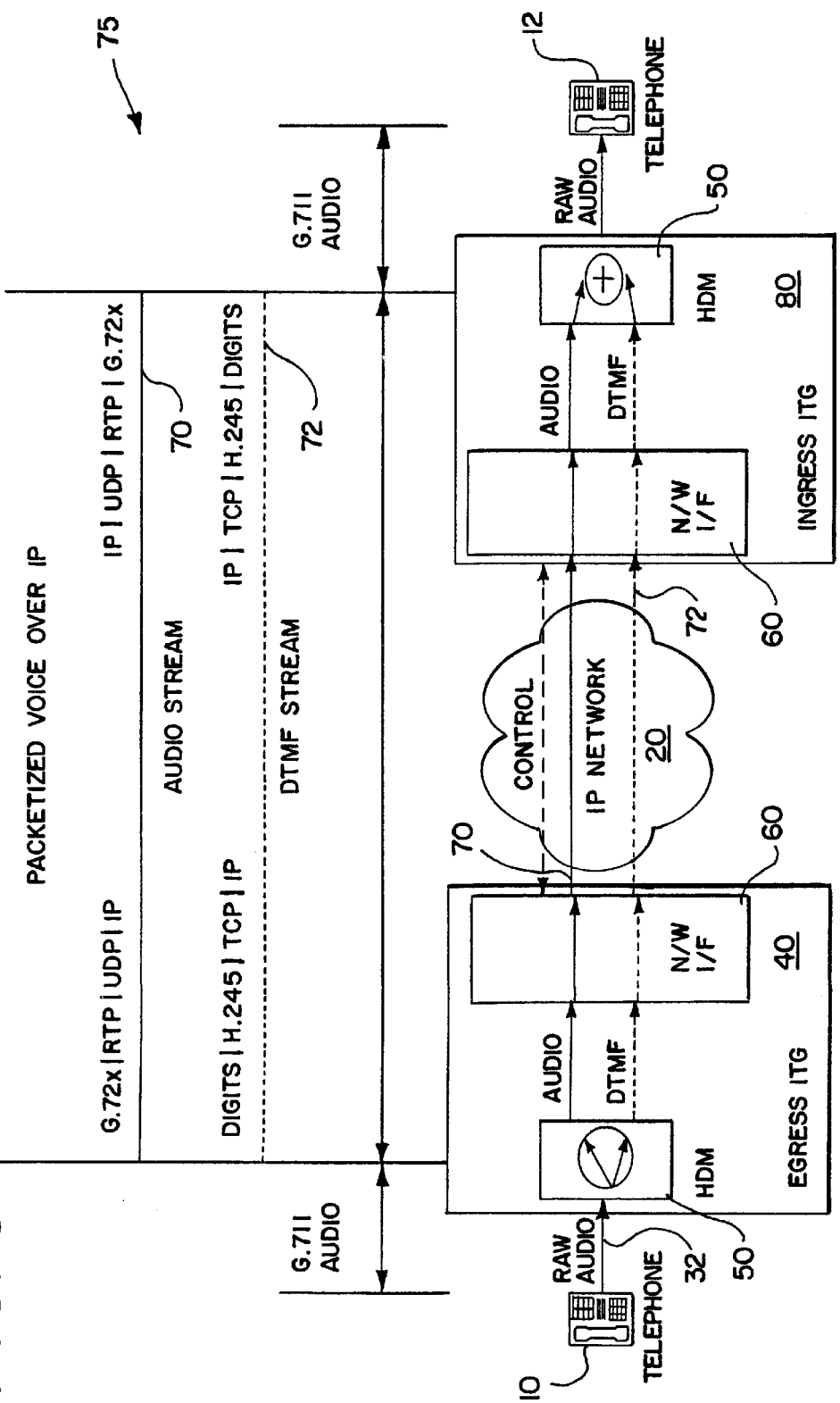
FIG. 3 is a block diagram of the system in FIG. 1 illustrating the communication of the audio signals and of the DTMF signals over the network-based telephony system of FIG. 1.

FIG. 3 illustrates how audio and DTMF signals may be carried from the first telecommunications device 10 to the second telecommunications device 12. The calling telecommunications device 10 generates an audio signal on connection 32. The audio signal preferably includes G.711 PCM-coded voice signals. DTMF signals, also G.711 PCM-coded, may be included in the audio signal as the user presses dialing keys, or otherwise generates DTMF tones on the connection 32. The HDM 50 in the calling Internet telephony gateway 40 receives the audio signal from connection 32. In a preferred embodiment, the G.711 audio signal is transcoded to a G.723/G.729 compressed audio signal. Because DTMF signals may become distorted as G.723/G.729 signals, the DTMF signals are removed from the original audio signal to split the signal into separate DTMF signals and the audio signal without the DTMF signals.

Each signal is formatted into a separate stream, an audio stream 70 and a DTMF stream 72, for transport over the Internet 20. FIG. 3 illustrates the protocols 75 used to create the streams. The audio signal is preferably converted to the G.72x (G.723 or G.729) compressed audio standard format. The compressed audio is formatted as packets of data according to the Real-time Transport Protocol (RTP) standard. The RTP packets are then transported according to the UDP/IP network and transport protocols. The stream 70 is processed using the same protocols in reverse at the called Internet telephony gateway 80.

The DTMF signals may be converted to the DTMF stream 72 for transport over the Internet 20 using a variety of methods. In a preferred embodiment, each DTMF signal is translated to a DTMF digit that may match the dialing keypad number pressed to generate the signal. The DTMF digit is communicated as an H.245 control, using for example, the UserInputIndication message. Using the TCP-based H.245 standard to transport the DTMF stream 72 ensures reliable delivery of the DTMF stream. Alternatively, the DTMF stream may be transported as UDP-based RTP packets.

The called Internet telephony gateway 80 receives the audio stream 70 and the DTMF stream 72 and extracts the audio and DTMF signals according to the protocol used to create the streams. The audio and DTMF signals are then multiplexed and encoded to first, a G.723 or G.729 signal, and then to a G.711 signal. The G.711 audio signal is communicated to the destination party at the telecommunications device 12.

While the telephone connection 30 is in use, a full duplex connection exists in which the calling Internet telephony gateway 40 and the called Internet telephony gateway 80 each manage to send and receive audio channels that transport the respective send and receive audio streams 70 and send and receive DTMF channels that transport the respective send and receive DTMF streams 72. A separate control channel may be created for each channel (audio and DTMF) or, the send and receive DTMF channels may transport control information, such as Q.xxx messages.

2. Software Architecture of the Internet Telephony Gateway

Figure 4:
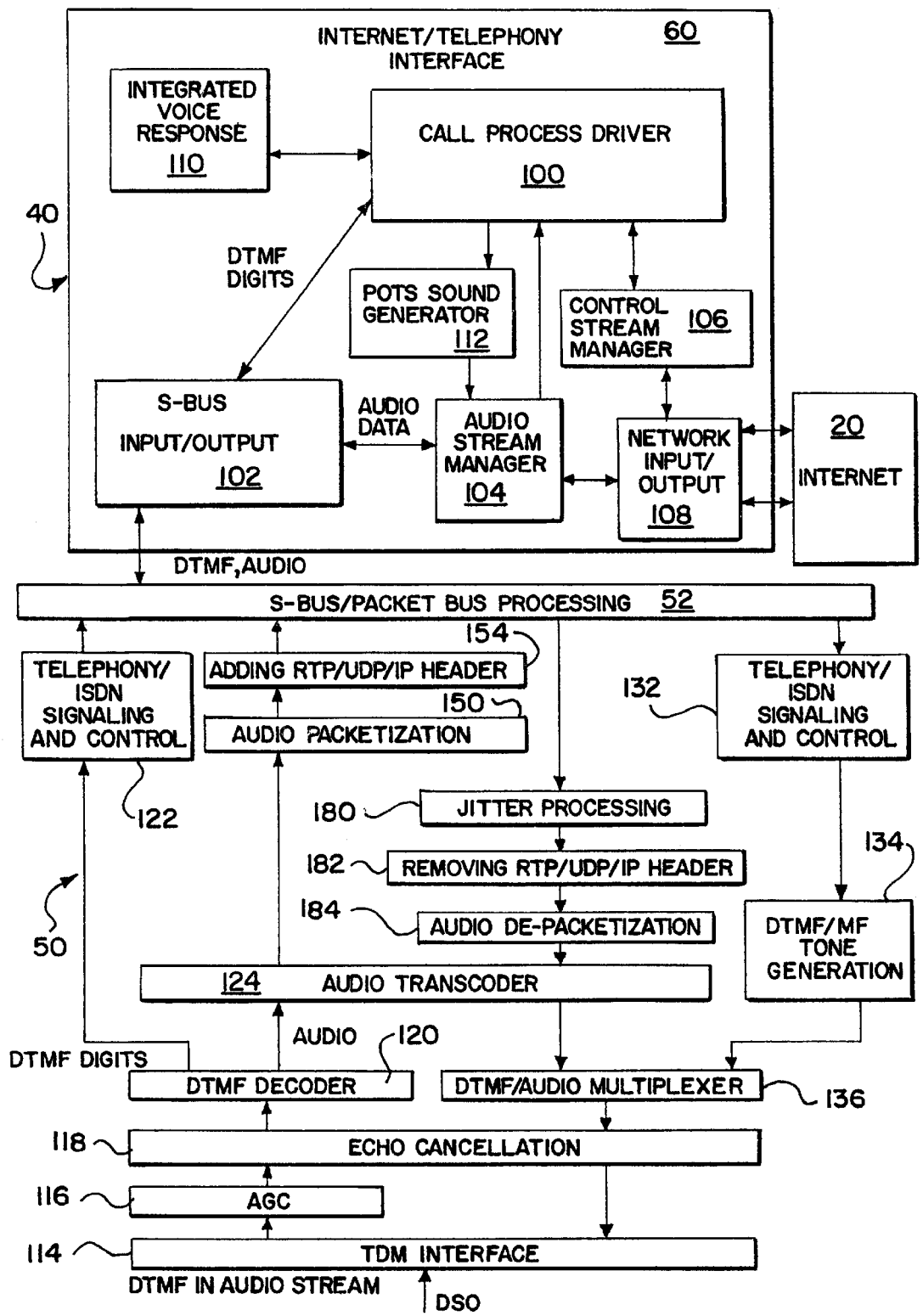
FIG. 4 is a high level diagram of the software architecture of the Internet telephony gateway of FIG. 2 showing structure for providing a POTS-like feel to a telephone connection.

FIG. 4 is a high level diagram of the software architecture of the Internet telephony gateway 40 of FIG. 2. The diagram includes the architecture of the network interface 60 and of one of the HDMs 50. The software architecture of the Internet telephony gateway 40 is preferably designed to use distributed processing of the RTP protocol as described in Schoo et al.

The network interface 60 includes a call process driver 100, an S-Bus I/O controller 102, an audio stream manager 104, a control stream manager 106, a POTS sound generator 112 and a network I/O controller 108. Optionally, an interactive voice response (IVR) driver 110 may be included.

The call process driver 100 manages the setting up, monitoring and tearing down of the telephone connection 30 (shown in FIG. 1). During the call setup process, the call process driver 100 in the calling Internet telephony gateway may receive a Q.931 setup message and search for an Internet telephony gateway closest to the destination telephone number. The call process driver 100 may obtain an address for a called Internet telephony gateway from a Global Domain Mapping Server (GDMS) which maps a destination telephone number and the IP address of the IP Telephony Gateway nearest to PSTN number that is being dialed. The calling Internet telephony gateway sends a Q.931 setup message to the called Internet telephony gateway. The called Internet telephony gateway sends a Q.931 connect message to the calling Internet telephony gateway. The calling Internet telephony gateway initiates an H.245 audio channel setup when it receives the Q.931 connect message.

The call process driver 100 may monitor the telephone connection by responding to messages from the called Internet telephony gateway (or calling internet telephony gateway) and by receiving messages from the audio stream manager 104. For example, if the called Internet telephony gateway could not connect to the destination telephone number, the called Internet telephony gateway may send an error message to the calling Internet telephony gateway using a non-standard H.245 indication. The error message may indicate that the called telephone at the destination telephone number is busy, or, for example, one of the errors listed below:

1) Errors/Failures Detected by the Calling CO switch:
    a) Dialing a Bad Number
    b) Phone user not authorized to connect to requested destination.
    c) CO could not complete the call due to GSTN error condition.
    d) All trunks are busy (For channelized T1).
    e) For ISDN, the Q.931 Progress and Disconnect messages are used to indicate error.
2) Errors/Failures Detected by the Calling Internet telephony gateway:
    a) All outgoing HDMs currently being used.
3) Errors/Failures Detected by the Called Internet telephony gateway:
    a) All outgoing HDMs currently being used.
4) Errors/Failures Detected by the Called CO switch:
    a) Dialing a Bad Number
    b) CO could not complete the call due to GSTN error condition.
    c) All trunks are busy (For channelized T1).
    d) For ISDN, the Q.931 Progress and Disconnect messages are used to indicate error
    e) Intended destination phone number not in service.
    f) Destination phone number has changed.
5) Other errors:
    a) Called party does not answer.

When the calling Internet telephony gateway receives an error message (such as destination phone busy), the calling Internet telephony gateway indicates the error to the calling telephone. A voice error message may be sent from the IVR 100 to the calling telephone to notify the user of the error. In a preferred embodiment, a POTS-like sound that indicates an error in a typical POTS connection is generated and sent to the calling telephone number for the same error. For example, for channelized T1, the fast busy signal, with the sound being twice as fast as the normal line busy signal, indicates that all trunks are busy.

One of ordinary skill in the art will understand that the call process driver 100 performs the monitoring function in the called Internet telephony gateway. For errors detected by the calling Internet telephony gateway, the called Internet telephony gateway receives notification of such errors and may notify the user of such errors as described above.

The call process driver 100 initiates a call tear down by disconnecting the H.245 audio channel. The Internet telephony gateway (calling or called) disconnects the H.245 audio channel and notifies the telephone connected to it. For example, if the calling telephone is placed back on-hook, the on-hook condition is sensed by the calling Internet telephony gateway. The calling Internet telephony gateway shuts down the H.245 connection. The called Internet telephony gateway senses that the H.245 connection is being shut down by responding to the H.245 messages from the calling Internet telephony gateway. The call process driver 100 in the called Internet telephony gateway notifies the called telephone by requesting that the POTS sound generator generate a POTS-like 'click' sound to be played out to the called telephone, the calling telephone or both.

The POTS sound generator 112 in the called and calling Internet telephony gateway's generates sounds in response to requests from the call process driver 100. The POTS sound generator 112 generates sounds by inserting sound data streams that translate to sounds made in the typical POTS telephone connection into the audio stream. The sound data streams may be hard-coded G.711 data streams that are stored in memory. When the call process driver 100 requests a sound, the POTS sound generator 112 retrieves the sound data stream from memory and packetizes the stream before inserting the stream in either the audio stream in the send audio channel, or the audio stream in the receive audio channel. In an alternative embodiment, the sound data streams are stored in WAV files or may be generated by a computer program.

In a switch independent Internet telephony gateway, the call process driver 100 includes resources for communicating with the IVR 110 to query the caller for the call setup information. The call process driver 100 may query the caller for the destination telephone number and an access code or password. The IVR 110 may include a voice prompt manager for playing voice messages back to the caller (e.g. a welcome message and prompts for a telephone number). In a switch-dependent Internet telephony gateway, the call process driver 100 includes resources for formatting the DTMF digits received from the HDM as the destination telephone number and as any other call setup information. The call process driver 100 includes resources for determining the called Internet telephony gateway 80 closest to the LEX 17 of the destination telephone number.

The call process driver 100 may also include functions for accessing resources for billing and for maintaining or accessing information about either the calling or the called party. For example, the call process driver 100 may be able to access or maintain a database that includes a data element indicating that the destination phone number is for a voice-mail system, a PBX with special services or some other supplementary service.

Once the telephone connection 30 is established, the call process driver 100 maintains the call resources. These resources may include, for example:

Caller telephone number
Calling telephone number
Calling Internet telephony gateway IP address
Logical channel for audio
Logical channel for control and signaling
Destination Type
Destination DTMF use at beginning
Caller Type
Caller DTMF use at beginning The above information may be kept in a data base, or may be received from the called or calling party using the H.245 capabilities exchange or using an H.245 UserInputCapability control message.

The call process driver 100 receives messages from remote Internet telephony gateways via a Control stream manager 106. The control stream received from the Internet 20 is translated through a network interface software structure (WinSock, BSD sockets or TDI), the details of which are not important and readily derived by persons of skill in the art.

In a preferred embodiment, the Control stream manager 106 receives H.245 UserInputIndication (UII) control messages from the network I/O 108 and sends DTMF digits to the call process driver 100. The H.245 messages may also include information that may be carried using non-standard (according to H.245v2) or standard (according to H.245v3) extensions to the UII control. The information that may be carried includes:

Time stamp: In terms of the RTP time stamp on the associated audio channel, the time at which the tone should be generated and injected into the PSTN audio stream.

Expiration time: In terms of the RTP time stamp on the associated audio channel, the after which the tone shall be considered "stale" and discarded by the called party without further processing.

logical channel number: the logical channel number of the associated audio channel.

indication of tone duration.

Alternatively, control information may be transmitted to the call process driver 100 according to different protocols. For example, the RTP protocol may be used to communicate DTMF digits in an RTP DTMF session separate from the RTP audio session.

When the Internet telephony gateway is the calling Internet telephony gateway, the control stream manager 106 receives DTMF digits from the call process driver 100 for transport to the Internet 20.

The Control stream manager 106 sends or receives DTMF digits to or from the network I/O 108. The network I/O 108 sends and receives audio and DTMF streams to and from the Internet 20. When receiving data from the network, the network I/O 108 determines whether it is an audio stream transported over the UDP/IP protocols, or a DTMF stream transported over the TCP/IP protocols. When sending data to the network, the network I/O 108 uses the appropriate protocol according to the data received. DTMF data in H.245 format is sent using the TCP/IP protocols and audio data in RTP packets is sent using the UDP/IP protocols. Preferably, the network I/O 108 uses a Network Driver Interface Specification (NDIS) for determining the protocols used by the data received from or to be sent to the Internet 20.

The audio stream manager 104 receives audio packets from either the network I/O 108 or the S-Bus I/O 102. The audio packets received from the network I/O 108 are stripped of UDP/IP headers and sent to the S-Bus I/O 102 for delivery to the HDM 50. The audio packets received from the S-Bus 102 are provided with a header and delivered to the network I/O 108. The audio stream manager 104 may send call status information to the call process driver 100.

The S-Bus I/O 102 receives and transmits packets of DTMF and audio data on the S-Bus (TDM) 52. The S-Bus I/O 102 directs DTMF digits to the call process driver 100 and audio RTP packets to the audio stream manager 104.

The HDM 50 sends and receives data to and from the network interface over the S-Bus 52. Although only one HDM 50 is illustrated in FIG. 4, the Internet telephony gateway 40 may include any number of HDMs 50, for example, 12 or 24 HDM cards and associated telephone line interface cards. Each HDM 50 shares the S-Bus 52 to communicate with the network interface 60.

The HDM 50 includes a TDM interface 114 for receiving audio data from the telephone/ISDN interface 48. The audio data is received in the form of raw G.711 data. At the DSP processing level, the audio data is processed by an automatic gain control module (AGC) 116, a line echo cancellation (LEC) module 118, a DTMF decoder 120 and an audio transcoder 124. The AGC module 116 is known in the art and requires no further description. The HDM 50 supports an LEC 118, which complies with the performance requirements of ITU G.165 with the exception of the tone disabler. The tone disabler defined by G.165 is primarily used to guard tones in telephone networks and can be implemented in the system when it is necessary. The echo cancellation uses signal correlation techniques to determine parameters of a filter that processes the incoming signal on the 4-wire side of a hybrid. The filter forms an estimate of the echo when an incoming signal is present. This estimate is subtracted from the signal on the return path.

The DTMF decoder 120 analyzes the G.711 audio data for data bytes and strings of data bytes that correspond to DTMF tones. The DTMF decoder 120 analyzes the audio data for strings of data representing a digitized tone having a frequency matching the combination of the low and high frequencies of the DTMF tones. Once the DTMF tone is detected, the digit matching the tone is output for use in signaling and control functions. The DTMF decoder 120 preferably removes the DTMF tone data from the audio data to produce the audio signal. The audio signal is output to the audio transcoder 124.

The audio transcoding between G.723.1 and G.711 is required for the HDM since the G.711 audio stream will always arrive from the PSTN/ISDN clients over T1 and the G.723 compressed stream will always arrive from the LAN side. Specifically, the following functions are supported by the audio transcoder 124:

Each DSP engine supports 2 concurrent full-duplex G.723.1/G.711 transcoder tasks.

The transcoder implementation is compliant to the G.723.1 and G.711 ITU implementation.

It supports encoder/decoder independence such that one can allocate any combination of encoders or decoders according to system configuration and within the DSP resource limits.

It supports synchronous output to the T1 interface.

In the HDM, the audio signal is received from the audio transcoder 124 and organized in RTP packets in an audio packetization module 150 and an RTP/UDP/IP header processing module 154.

The DTMF digits may be organized for transmission to the network interface 60 at a telephony/ISDN signal and control transmitter 122. The DTMF digits may be sent to the network interface 60 using a data structure that contains a time stamp, a tone duration and other selected information. The telephony/ISDN signal and control transmitter 122 may also be used to request information from the network interface 60. In a preferred embodiment, protocol processing is distributed between the network interface 60 and the HDM 50. The telephony/ISDN signal and control transmitter 122 may be used to request information associated with the telephone connection, such as information about the audio session, the DTMF session, the calling party, the called party, or the destination Internet telephony gateway.

The audio packetization module 150 receives strings or arrays or a stream of bytes representing the audio signal after it has been encoded to, preferably, the G.723.1 format. The audio packetization module 150 frames RTP-based packets containing the audio signal for transport over the Internet network. The function performed by the audio packetization module 150 conforms to the ITU H.225 Annex F—new audio packetization for G.723.1. Both 6.3 kbps and 53 kbps rates are a part of the G.723.1 encoder and decoder. A G.723.1 frame can be one of three sizes: 24 bytes, 20 bytes, or 4 bytes. These 4-byte frames are called SID (silence insertion descriptor) and are used to specify comfort noise parameters. There is no restriction on how 4, 20, and 24 bytes are intermixed. The first two bits in the frame determine the frame boundary. It is possible to switch between the two rates at any 30 ms frame boundary. This packetization scheme is compliant to RFC 1890 for the packetization interval with the following specification:

1. The first packet of a talk-spurt (first packet after a silence period-a talk-spurt is the group of data that represents voice signals after a period of silence) is distinguished by setting the market bit in the RTP data header.
2. The sampling frequency (RTP clock frequency) is 8000 Hz.
3. The packetization interval should have a duration of 30 ms (one frame) as opposed to the default packetization of 20 ms
4. Codecs should be able to encode and decode several consecutive frames within a single packet.
5. A receiver should accept packets representing between 0 and 180 ms of audio data as opposed to the default of 0 and 200 ms.

The audio packetization module 150 may insert silence packets for periods between talk-spurts. Alternatively, the silence may be suppressed by transmitting only talk-spurts.

The HDM 50 processes data received from the network interface 60 for transmission to the PSTN at the RISC processing level using a telephony/ISDN signaling and control receiver for receiving DTMF digits from the network interface 60 over the S-bus 52. The telephony/ISDN signaling and control receiver 132 receives the DTMF digits and other information and outputs it to the DTMF tone generator 134. The telephony/ISDN signaling and control receiver 132 may also receive information requested by any component of the HDM 50 via the telephony/ISDN signaling and control transmitter 122. The HDM 50 uses a jitter and packet re-ordering module 180, an audio de-packetization module 184, a DTMF/MF tone generator 134, a DTMF/audio multiplexer 136, the audio transcoding module 124, the echo cancellation module 118 and the TDM interface 114 to transmit data to the PSTN. The audio de-packetization module 184 receives RTP packets and converts the packets to a stream of G.723 or G.729 audio data. The audio transcoder 124 converts the G.723 or G.729 data to G.711 data.

The DTMF tone generator 134 converts the DTMF digits into the G.711 data that translates to the tone indicated by the DTMF digits. If tone duration information is included with the DTMF digits, the DTMF tone generator 134 uses the information to adjust set the tone duration. The DTMF tone data is output to the DTMF/audio multiplexer 136 where the DTMF tone data is injected into the audio stream. If a time stamp is included, the DTMF tone generator 134 and the DTMF/audio multiplexer 136 wait to inject the G.711 tone data into the audio data until the time indicated in the time stamp. In a preferred embodiment, the DTMF data is assumed to be aligned with the audio data when the audio and DTMF streams are received at the HDM 50 from the network interface 60.

Once the audio signal includes the DTMF tone data, the audio signal is processed for echo cancellation at the echo cancellation module 118 and sent to the PSTN via the TDM interface 114 to the T1/ISDN telephone interface 48.

The audio de-packetization module 184 processes the RTP packets that are received from the network for transmission to the PSTN. The packets are processed according to RFC 1890 and the notes above to yield the audio signal in G.723.1 format. The audio de-packetization module 184 receives packets from the jitter and packet reordering module 180. The jitter and packet re-ordering module 180 performs jitter buffering in a jitter buffer, with the size of the jitter buffer dynamically changed in order to deal with the bursty, asynchronous nature of packet switched data from the computer network. Packets may be re-ordered in transport and the jitter and packet re-ordering module 180 re-orders the packets to ensure that they are processed in the proper sequence.

The audio packets have an RTP/UDP/IP header attached to them by the RTP/UDP/IP header processing module 154. The RTP/UDP/IP header processing module 154 is responsible for adding the 12 octets of RTP header, 12 octets of UDP header, and 20 octets of IP header to all the audio packets which are transmitted from the PSTN to the LAN. The RTP/UDP/IP header-removing module 182 is responsible for removing the RTP/UDP/IP header from the audio packets for data from LAN to the PSTN.

Figure 5A:
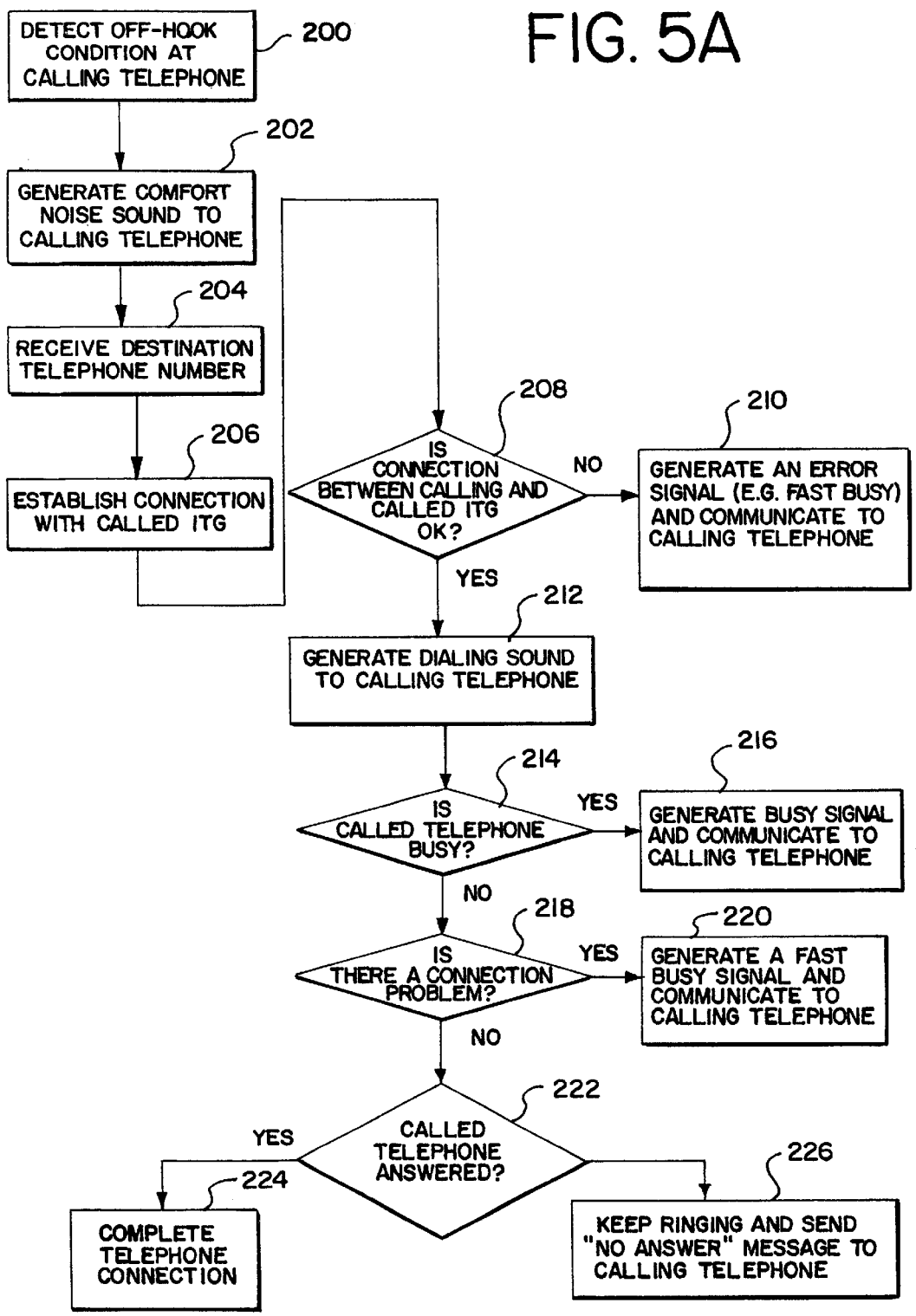
FIGS. 5A and 5B are flowcharts of methods for providing a POTS-like feel to a telephone connection.
Figure 5B:
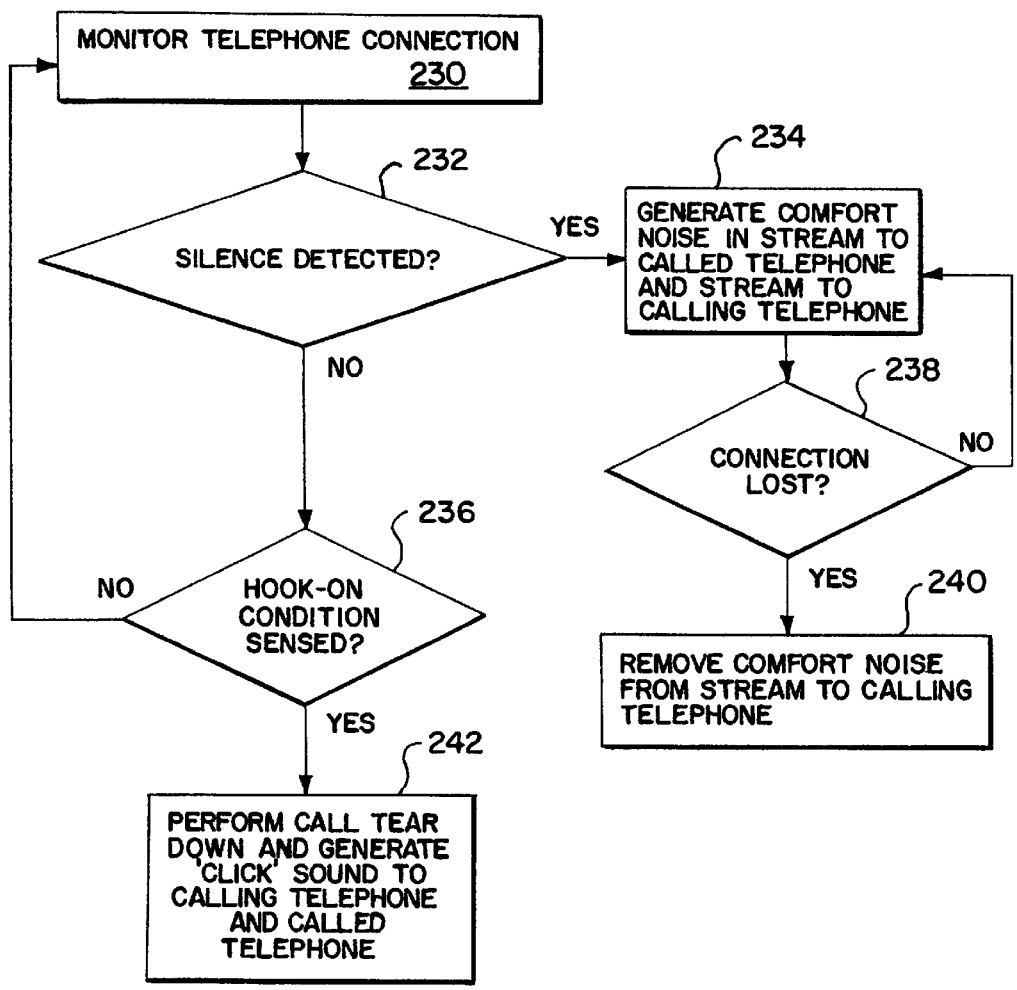

D. Methods for Providing POTS-like Sounds in a Telephone Connection in a Network-based Telephone System FIGS. 5A and 5B are flowcharts of methods for simulating a POTS connection in a network-based telephone system. FIG. 5A is a flowchart for a method of generating POTS-like sounds during the call setup process. FIG. 5B is a flowchart for a method of generating POTS-like sounds during the connection and during the call tear-down. The methods in FIGS. 5A and 5B may be performed in the system illustrated in FIG. 1, or in any other suitable system that uses a wide-area network (WAN), such as the Internet, as a transport medium for telephone calls.

The flowchart in FIG. 5A starts at step 200 when the user at the calling telephone picks up the telephone. The off-hook is detected first at the PSTN and then at the calling Internet telephony gateway when the PSTN connects the calling telephone to the calling Internet telephony gateway. In a switch-dependent Internet telephony gateway, the calling telephone dials a number to connect to the PSTN. The PSTN may either query the caller for the access information and destination telephone number, or a dialing method may be setup for the user to dial the access information and destination number in response to prompting signals. The detection of the off-hook condition in step 200 for a switch-dependent Internet telephony gateway is the receipt of a Q.931 setup message from the central office switch of the PSTN.

In the switch-independent Internet telephony gateway, the user dials a number that connects the telephone to the Internet telephony gateway via the central office of the PSTN. The Internet telephony gateway queries the user for access information and the destination telephone number. The detection of the off-hook condition at step 200 for a switch-independent Internet telephony gateway is the receipt of a Q.931 message from the PSTN to which the Internet telephony gateway responds with a query to the user for the access information.

When the calling Internet telephony gateway 40 detects the off-hook condition, the call process driver 100 requests the POTS sound generator 112 to generate a comfort noise sound at step 202. In the meantime, the calling Internet telephony gateway 40 receives a destination telephone number at step 204. The calling Internet telephony gateway 40 establishes a connection with the called Internet telephony gateway 80 at step 206 by determining the called Internet telephony gateway 80 which is the Internet telephony gateway nearest the destination telephone number, by sending Q.931 setup messages to the called Internet telephony gateway 80, by receiving a Q.931 connect message in response, and by sending the destination telephone number.

At decision block 208, the calling Internet telephony gateway 40 determines if the connection between the calling and called Internet telephony gateways is OK. If there is an error in the connection, the calling Internet telephony gateway 40 generates an error signal, or error voice message to the user at the calling telephone in step 210. One example of an error signal may be a fast busy signal. In a preferred embodiment, a voice error message is generated and the fast busy signal used for the condition in which there are no available PSTN trunk lines at the PSTN of the called telephone.

If the connection between the called and calling Internet telephony gateways is OK, the calling Internet telephony gateway 40 generates a dialing sound and communicates the sound to the calling telephone at step 212. The called Internet telephony gateway 80 determines if the called telephone is busy at step 214. If it is busy, the called Internet telephony gateway 80 sends an H.245 condition to the calling Internet telephony gateway 40 to provide the busy condition. The calling Internet telephony gateway 40 generates a busy signal at step 216 and communicates the signal to the calling telephone. If the called telephone is not busy, the called Internet telephony gateway 80 determines if there is a connection problem with the called telephone at decision block 218. For example, all trunks at the PSTN connection to the called Internet telephony gateway 80 may be used, or all trunks at the called Internet telephony gateway 80 may be used, or the destination telephone number may be bad or no longer in use. If the called Internet telephony gateway 80 detects a problem, an error signal, such as a fast busy sound, is generated and communicated to the calling telephone at step 216. If there are no connection problems, the called Internet telephony gateway 80 waits for the called telephone number to answer at step 222. If the called telephone answers, the telephone connection is complete at step 226.

The calling and called Internet telephony gateways 40, 80 monitor the status of the telephone connection and provide sounds similar to sounds during a typical POTS connection according to the flowchart in FIG. 5B. The telephone connection is monitored at step 230 by detecting conditions and communicating the conditions to the other Internet telephony gateway. If at decision block 232, a silent period is detected by either Internet telephony gateway, a comfort noise sound is generated and communicated to the telephone that the Internet telephony gateway is connected to. For example, at step 234, the comfort noise is communicated to the calling telephone by the calling Internet telephony gateway and to the called telephone by the called Internet telephony gateway.

During the telephone connection both Internet telephony gateways determine if a hook-on condition is sensed at step 236. When a hook-on condition is sensed, the Internet telephony gateway that senses the condition begins a tear-down of the telephone connection. The tear-down of the connection includes the disconnection of the H.245 audio channels. When the other Internet telephony gateway detects that the H.245 audio channel is being disconnected, it generates a 'click' sound to the telephone to which it is connected at step 242.

Presently preferred embodiments have been set forth above. Persons of skill in the art will appreciate that modifications may be made from the disclosed embodiments without departure from the spirit and scope of the invention. For example, although the above description of the presently preferred embodiments referred to Internet telephone connections between two telephones, one of ordinary skill in the art will appreciate that alternative embodiments may include connections between an H.323 PC client connected to the Internet and a telephone, or PC connected to the telephone gateway. Furthermore, while the best mode known to the inventors for practicing the invention has been disclosed in the context of present or proposed commercial products of the applicants' assignee, it will be appreciated that the teachings are readily adaptable to other types of network access servers marketed by others in the industry, such as Lucent, Ascend, Cisco, Nortel, Cascade Communications, etc. This true spirit and scope of the invention is defined by the following claims, to be interpreted in light of the above description.

We claim:

1. In a network-based telephone system comprising a calling telecommunications device communicably connected to a packet-based network to communicate with a called telecommunications device, a method for simulating a typical plain old telephone system (POTS) connection for a user of said telecommunications device, the method comprising the steps of:

detecting a condition in a telephone connection between said calling telecommunications device and said at least one called telecommunications devices, the condition selected from the group consisting of an off-hook condition, a dialing condition, an error condition, a satisfactory condition, a silence condition, and a hook-on condition;

generating a sound in response to said condition by inserting sound data streams into the telephone connection that simulate a corresponding POTS sound when a POTS condition corresponding to said condition exists in said typical POTS telephone connection; and communicating the sound on said telephone connection.

2. The method of claim 1 further comprising, before the step of detecting said condition, the steps of:

establishing said telephone connection by the steps of:
said first user actuating said telecommunications device to connect to said packet-based network;
dialing a destination telephone number;
generating a dialing sound that simulates a corresponding dialing sound in said typical POTS connection;
connecting to said called telecommunications device using said destination telephone number; and
completing said telephone connection by a second user actuating said called telecommunications device.

3. The method of claim 2 wherein the step of dialing said destination telephone number includes the step of generating a comfort noise sound and communicating said sound to said calling telecommunications device.

4. The method of claim 2 wherein the step of connecting to said called telecommunications device includes the step of generating a comfort noise sound and communicating said sound to said calling telecommunications device.

5. The method of claim 1 further comprising the steps of:
actuating said calling telecommunications device to end said telephone connection, said end of said telephone connection being the condition detected in said detecting step; and
whereby said sound generated in said generating step is a click sound.

6. The method of claim 1 wherein the condition detected in said detecting step is a period of silence and whereby said sound generated in said generating step is a comfort noise sound.

7. The method of claim 1 further comprising the step of communicating said sound to said calling telecommunications device.

8. The method of claim 1 further comprising the step of communicating said sound to said called telecommunications device.

9. In a network-based telephone system comprising a calling telecommunications device communicably connected to a packet-based network to communicate with a called telecommunications device, a method for simulating a typical plain old telephone system (POTS) connection setup for a user of said telecommunications device, the method comprising the steps of:

said user actuating said telecommunications device to connect to said packet-based network;
dialing a destination telephone number;
generating a dialing sound by inserting dialing sound data streams into data packets for transmission, the dialing sound simulates a corresponding dialing sound in said typical POTS connection;
detecting an error condition at said called telecommunications device;
generating an error sound in response to said error condition by inserting error sound data streams into data packets for transmission, the error sound simulates a corresponding POTS error sound when a POTS error condition corresponding to said error condition exists in said typical POTS telephone connection setup; and
communicating said error sound over said telephone connection.

10. The method of claim 9 wherein the error condition detected in said detecting step is a busy condition and whereby said sound generated in said generating step is a busy signal sound.

11. The method of claim 9 wherein the error condition detected in said detecting step is a network error condition and whereby said sound generated in said generating step is a fast busy signal sound.

12. The method of claim 9 further comprising the step of communicating said sound to said calling telecommunications device.

13. The method of claim 9 further comprising the step of communicating said sound to said called telecommunications device.

14. A network-based telephone system comprising a calling telecommunications device and a called telecommunications device over a packet-based network, the system comprising:

a calling network access server connected to said calling telecommunications device and a called network access server connected to said called telecommunications device, said calling network access server comprising:

a call process driver for connecting to said called network access server to initiate a telephone connection when a user actuates said calling telecommunications device and for detecting conditions in said telephone connection, the conditions selected from the group consisting of an off-hook condition, a dialing condition, an error condition, a satisfactory condition, a silence condition, and a hook-on condition; and a POTS-sound generator for generating POTS-sounds sound by inserting sound data streams into data packets for transmission that simulate sounds made in a typical POTS telephone connection when said call process driver detects a corresponding condition in said telephone connection; and said called network access server being operable to complete said telephone connection by connecting to said called telecommunications device when said call process driver connects to said called network access server.

15. The system of claim 14 wherein said POTS-sound generator further comprises:

a sound memory for storing at least one sound data stream.

16. The system of claim 15 wherein:

one of said sound data streams includes a 'click' sound data stream; and wherein said POTS-sound generator imposes said 'click' sound data stream in said telephone connection when said call process driver detects a hang-up condition.

17. The system of claim 15 wherein:

one of said sound data streams includes a dialing sound data stream; and wherein said POTS-sound generator imposes said dialing sound data stream in said telephone connection when said call process driver detects a connection initiating condition.

18. The system of claim 15 wherein:

one of said sound data streams includes a comfort noise sound data stream; and wherein said POTS-sound generator imposes said 'click' sound data stream in said telephone connection when said call process driver detects a silent connection normal condition.

19. The system of claim 15 wherein:

one of said sound data streams includes a comfort noise sound data stream; and wherein said POTS-sound generator imposes said comfort noise sound data stream in said telephone connection when said call process driver detects a connection initiating condition.

20. The system of claim 15 wherein:

one of said sound data streams includes a busy sound data stream; and wherein said POTS-sound generator imposes said busy sound data stream in said telephone connection when said call process driver detects a called party busy condition.

21. The system of claim 15 wherein:

one of said sound data streams includes a fast busy sound data stream; and wherein said POTS-sound generator imposes said fast busy sound data stream in said telephone connection when said call process driver detects a connecting error condition.

22. The system of claim 15 wherein said at least one sound data stream is stored as a WAV file.

23. The system of claim 15 wherein said at least one sound data stream is stored as a G.711 stream.

24. The system of claim 14 wherein said POTS-sound generator further comprises:

a 'click' stream generator for generating a 'click' sound stream and imposing said 'click' sound stream in said telephone connection when said call process driver detects a hang-up condition.

25. The system of claim 14 wherein said POTS-sound generator further comprises:

a dialing stream generator for generating a dialing stream and imposing said dialing stream in said telephone connection when said call process driver detects a connection initiating condition.

26. The system of claim 14 wherein said POTS-sound generator further comprises:

a comfort noise stream generator for generating a comfort noise stream and imposing said comfort noise stream in said telephone connection when said call process driver detects a silent connection normal condition.

27. The system of claim 14 wherein said POTS-sound generator further comprises:

a comfort noise stream generator for generating a comfort noise stream and imposing said comfort noise stream in said telephone connection when said call process driver detects a connection initiating condition.

28. The system of claim 14 wherein said POTS-sound generator further comprises:

a busy signal stream generator for generating a busy signal stream and imposing said busy signal stream in said telephone connection when said call process driver detects a called party busy condition.

29. The system of claim 14 wherein said POTS-sound generator further comprises:

a fast busy stream generator for generating a fast busy stream and imposing said fast busy stream in said telephone connection when said call process driver detects a connecting error condition.

* * * * *